Oct. 4, 1932.   F. W. BELL ET AL   1,881,346
BICYCLE LOCK
Filed Sept. 9, 1931    2 Sheets-Sheet 2
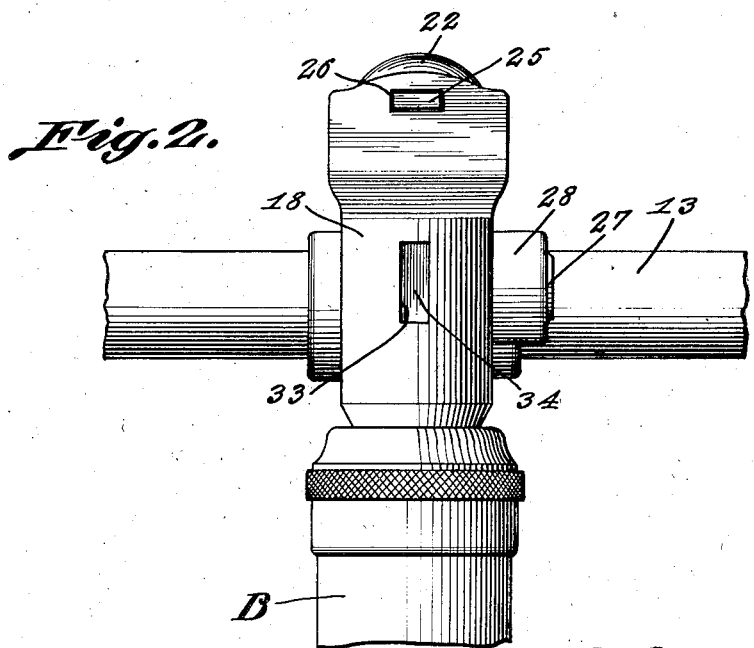
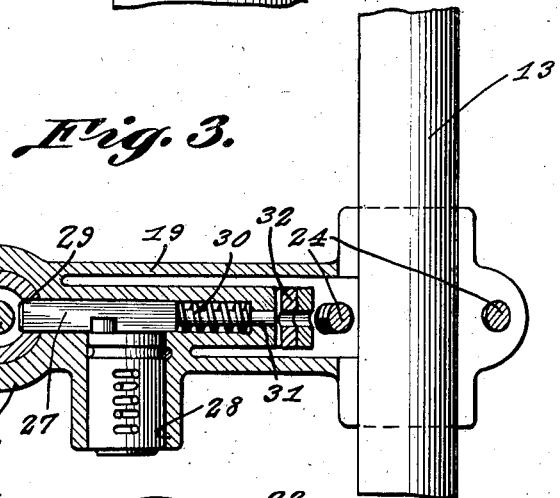
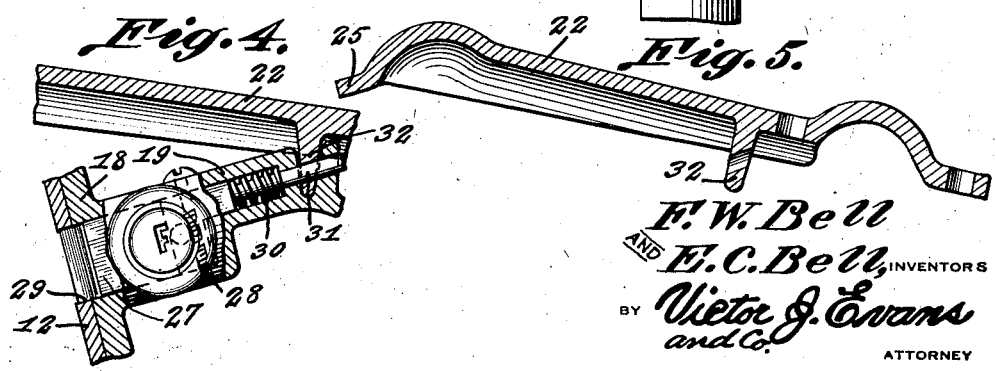
F. W. Bell
E. C. Bell, INVENTORS
BY Victor J. Evans and Co.
ATTORNEY Patented Oct. 4, 1932

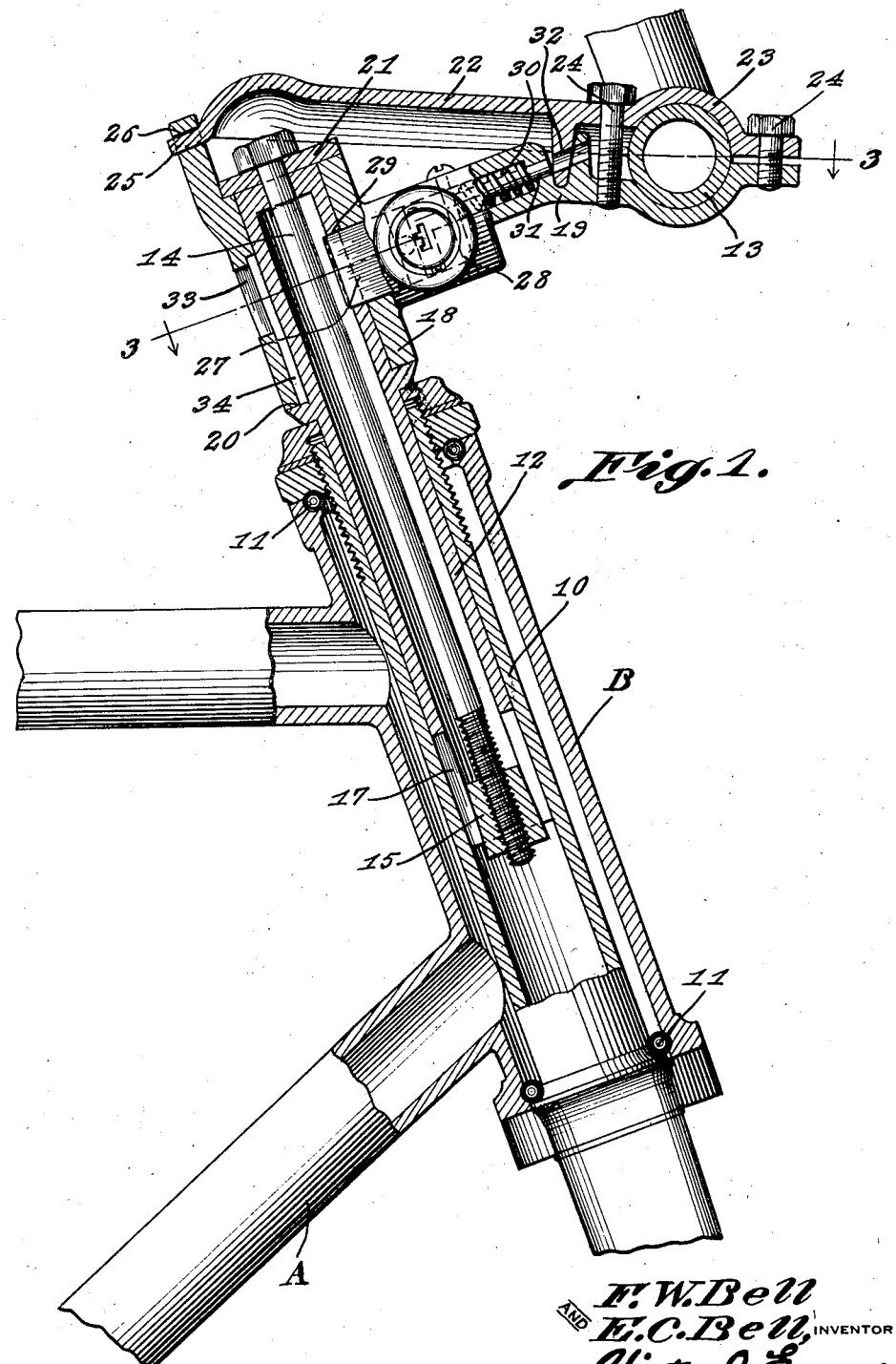

1,881,346

UNITED STATES PATENT OFFICE

FRANK W. BELL AND EUGENE C. BELL, OF SACRAMENTO, CALIFORNIA

BICYCLE LOCK

Application filed September 9, 1931. Serial No. 561,968.

The invention relates to a lock and more especially to a bicycle lock.

The primary object of the invention is the provision of a lock of this character wherein the handle bars of a bicycle can be made fast to the steering stem or post when the bicycle is in use and when such bicycle is not in use the handle bars will be free of the stem or post so that such bicycle is unfit for use or riding, thereby avoiding theft of the same or the riding of the bicycle by other than its owner.

Another object of the invention is the provision of a lock of this character wherein the same is built into a handle bar bracket and in its installation cannot be tampered with so as to render such lock ineffective for the purposes thereof or the removal of the handle bars and its bracket by a person other than the owner of the bicycle or the person having the key for the lock.

A further object of the invention is the provision of a lock of this character which is key operated, simple in construction, thoroughly reliable and efficient in its purpose, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary elevation of a bicycle, the same being partly in section with the lock constructed in accordance with the invention applied and set for the steering of the bicycle.

Figure 2 is a fragmentary front elevation thereof.

Figure 3 is a sectional view on the line 3—3 of Figure 1 looking in the direction of the arrows.

Figure 4 is a fragmentary vertical sectional view showing the lock with its bolt shifted from the position shown in Figure 1.

Figure 5 is a vertical longitudinal sectional view through the removable cover section of the handle bar bracket.

Similar reference characters indicate corresponding parts throughout the several views of the drawings.

Referring to the drawings in detail, A designates generally the fore portion of a bicycle frame having the tubular head B in which is fitted the steering post or stem 10 as is usual and in the fitting are provided the customary ball type bearings 11 located at the top and bottom of said head for such post or stem 10 therein.

Fitted within the stem or post 10 is the shank 12 for a handle bar 13, the latter being of any standard type and said shank is secured within the post or stem 10 by a wedging bolt 14 operating an internal wedge 15 within said shank for spreading the split ends 17 thereof within the post or stem. On the upper end of the shank 12 is a hub or sleeve 18 of the handle bar bracket 19 and this hub or sleeve 18 is rotatably fitted to rest against an annular shoulder 20 on said shank 12 and such sleeve is held in place by a washer or cap disk 21 carried by the bolt 15 and plays against the outer end of the hub or sleeve 18 as is clearly shown in Figure 1 of the drawings.

The bracket 19 is provided with a removable cover section 22 and the same with the bracket 19 constitutes clamping jaw portions 23 for the handle bar 13 which is fitted therebetween and held clamped by the bolt fasteners 24 passed through suitable openings in the section 22 and threaded into the bracket 19. The cover section 22 at the inner end thereof is provided with a lip or tongue 25 to removably engage in a slotted keeper 26 on the outer end of the hub or sleeve 18 and this keeper extension 26 protrudes above the same.

Fitted within the bracket 19 is the lock mechanism including the key actuated bolt 27 which when moved by a key (not shown) insertable in the barrel 28 of the lock mechanism will engage in or disengage from a seat or slot 29 provided in the shank 12 and when the bolt 27 is engaged in the seat or slot 29 the hub or sleeve 18 will be locked with the shank and thus the bracket 19 and handle bar 13 carried by the latter will be secured to the shank 12 so that the bicycle can be steered. On retracting the bolt 27 from the seat or slot 29 the hub or sleeve 18 of the bracket 19 will be freed from the shank 12 thus preventing the steering of the bicycle and rendering it ineffective for riding purposes. The bolt 27 has associated therewith the coiled spring 30 for tensioning said bolt and this spring encircles a latching pin extension 31 on the bolt adapted for engagement in a keeper lug 32 on the cover section 22 of the bracket and such engagement of the extension 31 with the lug 32 is effected when the bolt 27 is retracted from the seat or slot 29 so that it is impossible for an unscrupulous person removing the lid or cover section 22 from the bracket 19 to gain access to the wedging bolt 14 securing the shank 12 of the handle bar bracket 19 in the post or stem 10, or for surreptitious manipulation of the locking mechanism interiorly of the bracket 19 for the handle bar 13.

The hub or sleeve 18 of the bracket 19 is formed with an opening 33 directly opposite the seat or slot 29 to permit of the assembly of the bolt 27 with the locking mechanism in the bracket 19 prior to the mounting of said bracket upon the shank 12 and this opening 33 is closed by a slide 34 when the hub or sleeve 18 is fitted upon the shank 12 as is clearly seen from Figures 1 and 3 of the drawings.

It will be apparent that the handle bar 13 can be locked with the steering post or stem 10 when the bicycle is to be used by the rightful owner and when not in use by such owner the handle bar 13 will be loose from the shank 12, thus preventing the riding of the bicycle as the same is incapable of being steered. Also in this condition of the bicycle it is impossible for an unscrupulous person to remove the cover section 22 for tampering with the locking mechanism in the bracket 19 for the handle bar 13 of such bicycle.

What is claimed is:—

1. In a bicycle, a steering post, a handle bar connected with the post, a locking mechanism associated with the handle bar for rendering the connection thereof with the post loose or fast therewith, and a cover section associated with the handle bar and also locked by said locking mechanism when the connection of the handle bar with the post is loose.

2. In a bicycle, a steering post, a handle bar connected with the post, a locking mechanism associated with the handle bar for rendering the connection thereof with the post loose or fast therewith, a cover section associated with the handle bar and also locked by said locking mechanism when the connection of the handle bar with the post is loose, and means for securing the cover section to hold the same in place.

3. In a bicycle, a steering post, a handle bar connected with the post, a locking mechanism associated with the handle bar for rendering the connection thereof with the post loose or fast therewith, a cover section associated with the handle bar and also locked by said locking mechanism when the connection of the handle bar with the post is loose, means for securing the cover section to hold the same in place, and means for joining the handle bar with the post and concealed by said cover section.

In testimony whereof we affix our signatures.

FRANK W. BELL.
EUGENE C. BELL.